(12) United States Patent
Pelliconi

(10) Patent No.: US 6,995,602 B2
(45) Date of Patent: Feb. 7, 2006

(54) CHARGE PUMP SYSTEM

(75) Inventor: Roberto Pelliconi, Imola (IT)

(73) Assignee: STMicroelectronics, S.r.l., (Agrate Brianza) (IT)

( * ) Notice: Subject to any disclaimer, the term of this patent is extended or adjusted under 35 U.S.C. 154(b) by 39 days.

(21) Appl. No.: 10/327,616

(22) Filed: Dec. 20, 2002

(65) Prior Publication Data

US 2003/0151432 A1 Aug. 14, 2003

(30) Foreign Application Priority Data

Dec. 21, 2001 (IT) .......................... MI2001A2789

(51) Int. Cl.
*G05F 1/10* (2006.01)
(52) U.S. Cl. ..................... 327/536; 327/537
(58) Field of Classification Search ................ 327/157, 327/148, 536, 537, 538
See application file for complete search history.

(56) References Cited

U.S. PATENT DOCUMENTS

| | | | | |
|---|---|---|---|---|
| 4,883,976 A | * | 11/1989 | Deane | 327/536 |
| 5,289,137 A | * | 2/1994 | Nodar et al. | 330/296 |
| 5,874,850 A | | 2/1999 | Pulvirenti et al. | |
| 6,236,260 B1 | * | 5/2001 | Vest et al. | 327/536 |
| 6,424,203 B1 | * | 7/2002 | Bayadroun | 327/536 |
| 6,456,150 B1 | * | 9/2002 | Sacco et al. | 327/534 |
| 6,545,529 B2 | * | 4/2003 | Kim | 327/536 |
| 6,617,832 B1 | * | 9/2003 | Kobayashi | 323/266 |

* cited by examiner

Primary Examiner—My-Trang Nuton
Assistant Examiner—Cassandra Cox

(74) Attorney, Agent, or Firm—Lisa K. Jorgenson; P. G. Scott Born; Graybeal Jackson Haley LLP

(57) ABSTRACT

The present invention refers to a charge pump system supplied by a direct voltage signal and supplying on the output terminal a voltage signal with a higher value of said direct voltage signal. The charge pump system comprising an oscillator supplied by said direct voltage signal and having two outputs in phase opposition between each other, a load storage capacitor having a first terminal connected to a first reference potential and a second terminal connected to the output terminal of the charge pump system, at least one charge section having an output charge terminal, an input supply terminal, a first side terminal and a second side terminal connected respectively to the outputs of the oscillator, a first charge transfer capacitor and a second charge transfer capacitor having respective first terminals connected to said first and second side terminals, a bridge comprising two inverters CMOS connected together with loop connection so as to form a flip-flop having inputs connected to respective second terminals of the first charge transfer capacitor and of the second charge transfer capacitor, negative supply terminals connected together to the input supply terminal and positive supply terminals connected together to the output charge terminal. The at least one charge section is connected in series with the output terminal connected to the second terminal of said charge storage capacitor and the input terminal connected to the direct voltage supply signal. The at least one charge section comprises a protection device positioned between the second terminals of the first charge transfer capacitor and of the second charge transfer capacitor; the protection device is capable of making substantially equal the voltage signals on the second terminals of the first charge transfer capacitor and of the second charge transfer capacitor in off conditions of the charge pump system.

30 Claims, 3 Drawing Sheets

US 6,995,602 B2

CHARGE PUMP SYSTEM

PRIORITY CLAIM

This application claims priority from Italian patent application No. MI2001A 002789, filed Dec. 21, 2001, which is incorporated herein by reference.

TECHNICAL FIELD

The present invention generally refers to a charge pump system.

BACKGROUND

In recent years there has been a considerable increase in equipment that uses a low supply voltage, such as communication equipment, portable units, etc. This equipment is provided with several internal devices that require circuits suitable for elevating a direct voltage in certain periods of time; among these voltage elevator circuits charge pump devices are widely used.

A charge pump structure is present in U.S. Pat. No. 5,874,850. The structure comprises generically a single stage circuit or charge section Si or n stages Si connected in series S1 ... SN by means of the input terminals C1 ... CN and the output terminals D1 ... DN as shown in FIG. 1; in this case the respective side terminals A1 ... AN of the single stages Si are all connected to a first output terminal O1 of an oscillator OSC while the terminals B1 ... BN are connected to a second output terminal O2 of the oscillator OSC. The input terminal Ci of a single stage is connected to the output terminal Di+1 of the successive stage; the terminal CN of the last stage is connected to the supply voltage VS while the terminal D1 of the first stage, that constitutes the output terminal OUT of the charge pump circuit structure, is connected to a load storage capacitor SC which has the other terminal connected to ground. The signal generated by the oscillator OSC varies between the reference potential GND, in particular the ground, and the potential of the voltage VS. The voltage on the terminal OUT is equal to N+1 times the voltage VS.

A single stage circuit or charge section Si is shown in FIG. 2; said circuit stage Si comprises a first charge transfer capacitor TC1 and a second charge transfer capacitor TC2 which have first terminals connected to respective side terminals Ai and Bi, two inverters connected together in loop connection so as to form a flip-flop that has inputs Ji, Ki connected respectively to second terminals of the first charge transfer capacitor TC1 and of the second charge transfer capacitor TC2, negative supply terminals connected together with the input supply terminal Ci and positive supply terminals connected together with the output charge terminal Di.

The first inverter is constituted of MOS transistors M1 and M2 while the second inverter is constituted of MOS transistors M3 and M4. In addition FIG. 2 shows the bulk diodes Db1, Db2, Db3, Db4 of the respective transistor M1–M4; the diodes are positioned so that the cathodes of the diodes Db1 and Db3 are connected to the terminal Di while the anodes of the diodes Db2 and Db4 are connected to the terminal Ci.

If we consider that the charge pump structure is produced with a single stage circuit Si, when a supply voltage VS is applied the capacitor SC is discharged and the voltage in output is initially VS−2VD, where VD is the voltage at the ends of each diode, approximately 0.7V; the capacitor SC is charged through the bulk diodes. When the voltage difference between the output voltage and the supply voltage VS becomes higher than the threshold voltage of the MOS transistors, the same transistors start to conduct and to load the capacitor SC, replacing the bulk diodes in said operation. The capacitors TC1 and TC2 supply the capacitor SC according to whether respectively the first output terminal of OSC is low and the second output terminal of OSC is high or vice versa.

It is possible that in off conditions of the charge pump circuit above described it could happen that the difference of the values of the voltages on the terminals of the capacitors TC1 or TC2 associated with the terminals of the respective inverter is very high and leads to the breakdown of the MOS transistors that constitute the inverters. This can occur if for example one of the capacitors TC1 and TC2 discharges much more quickly than the other by means of the leakage currents or if the voltage on the output terminal increases causing the breakdown of the transistors.

SUMMARY

In view of the state of the technique described above, one embodiment of the present invention is a charge pump system provided with a protection device that permits the above-mentioned inconvenience to be overcome.

In accordance with an embodiment of the present invention, a charge pump system is fed by a direct voltage signal and supplies on the output terminal a voltage signal with a higher value than said direct voltage signal, said charge pump system comprising an oscillator supplied by said direct voltage signal and having two outputs in phase opposition between each other, a load storage capacitor having a first terminal connected to a first reference potential and a second terminal connected to the output terminal of the charge pump system, at least one charge section having an output charge terminal, an input supply terminal, a first side terminal and a second side terminal connected respectively to the outputs of said oscillator, a first charge transfer capacitor and a second charge transfer capacitor having respective first terminals connected to said first and second side terminals, a bridge comprising two CMOS inverters connected together with a loop connection so as to form a flip-flop having inputs connected to respective second terminals of said first charge transfer capacitor and of said second charge transfer capacitor, negative supply terminals connected together to said input supply terminal and positive supply terminals connected together to said output charge terminal, said at least one charge section being connected in series with the output terminal connected to the second terminal of said charge storage capacitor and the input terminal connected to the direct voltage supply signal, characterized in that said at least one charge section comprises a protection device positioned between said second terminals of said first charge transfer capacitor and of said second charge transfer capacitor, said protection device being capable of making substantially equal the voltage signals on said second terminals of said first charge transfer capacitor and of said second charge transfer capacitor in off conditions of said charge pump system.

Thanks to this embodiment of the present invention it is possible to produce a charge pump system comprising a protection device that prevents the transistors in off conditions of the charge pump system from breaking down.

BRIEF DESCRIPTION OF THE DRAWINGS

The characteristics and advantages of the present invention will appear evident from the following detailed description of an embodiment thereof illustrated as non-limiting example in the enclosed drawings, wherein.

DETAILED DESCRIPTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention as defined by the appended claims. Thus, the present invention is not intended to be limited to the embodiments shown, but is to be accorded the widest scope consistent with the principles and features disclosed herein.

Figure 2:
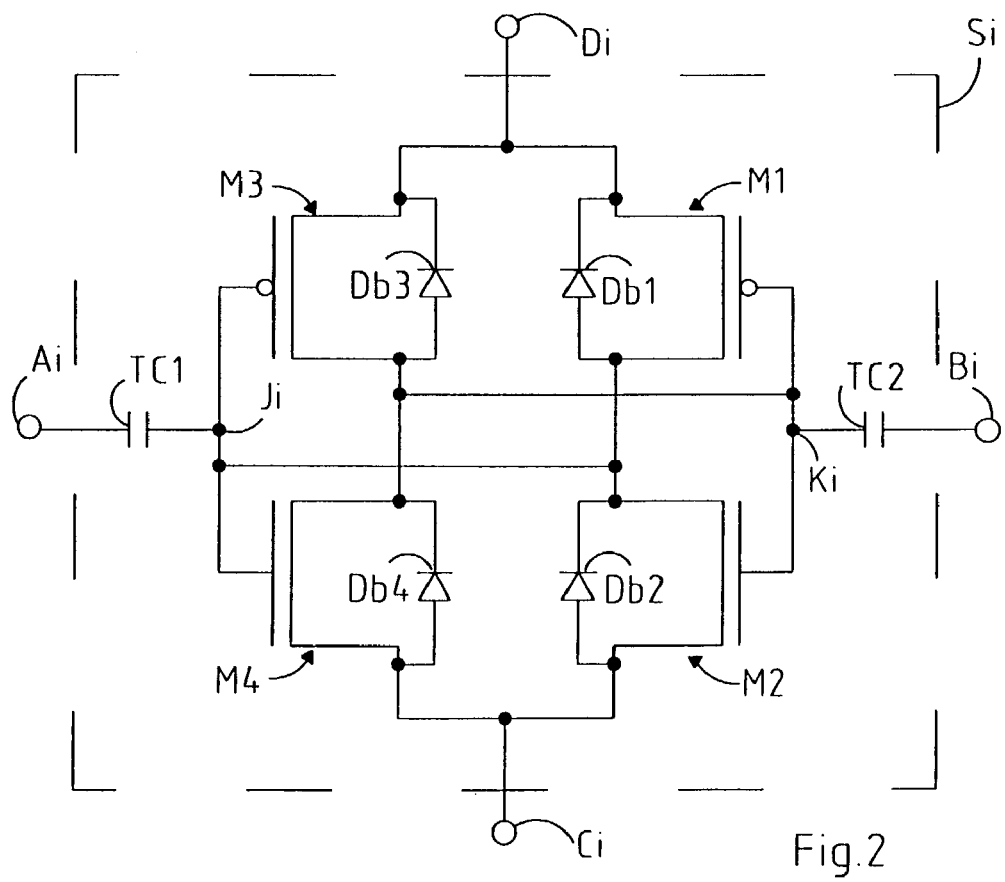
FIG. 2 is a schematic view of a single stage circuit or charge section of the charge pump circuit of FIG. 1.
Figure 3:
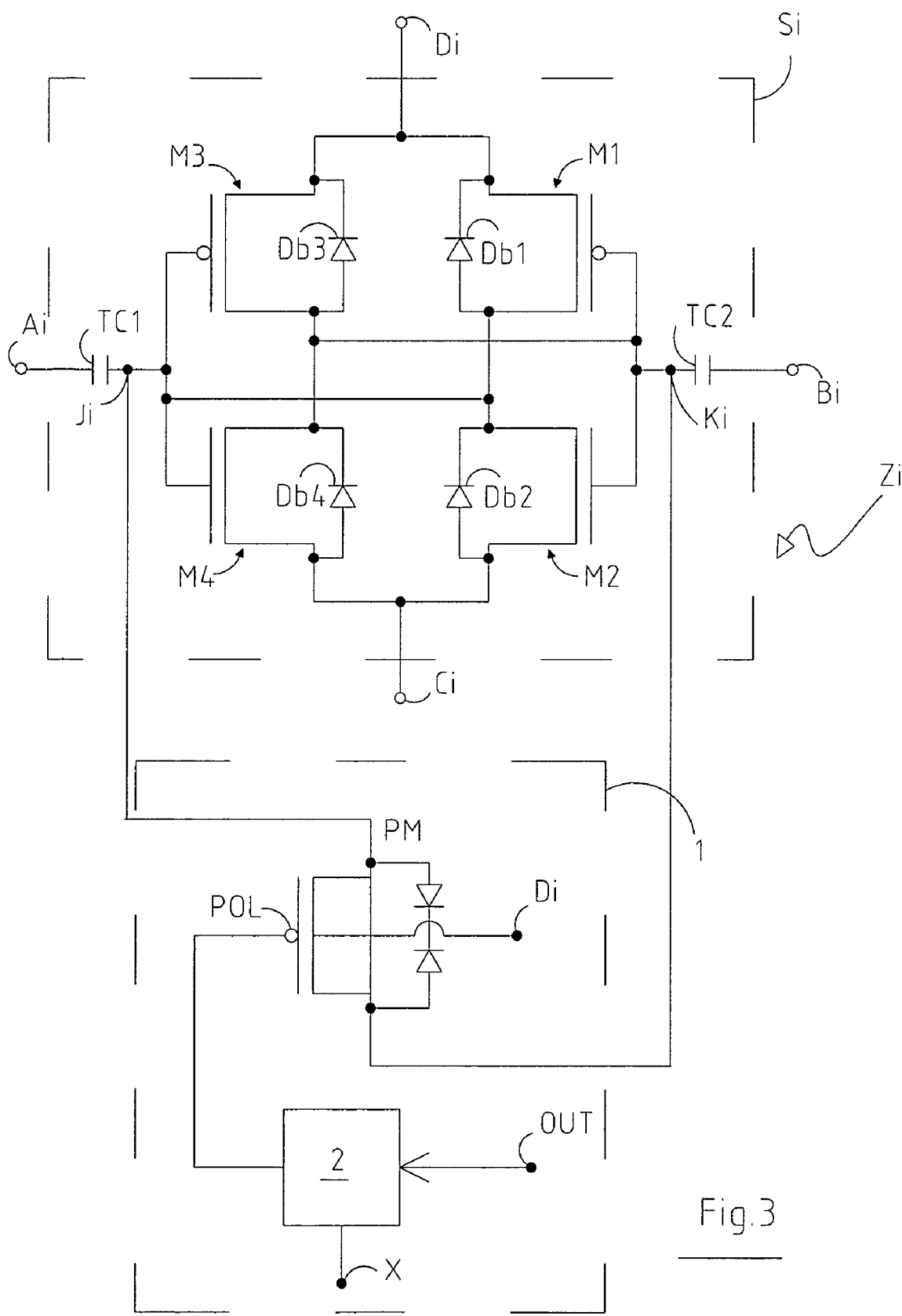
FIG. 3 is a schematic view of a single stage of a charge pump circuit provided with a protection device according to an embodiment of the present invention.
Figure 4:
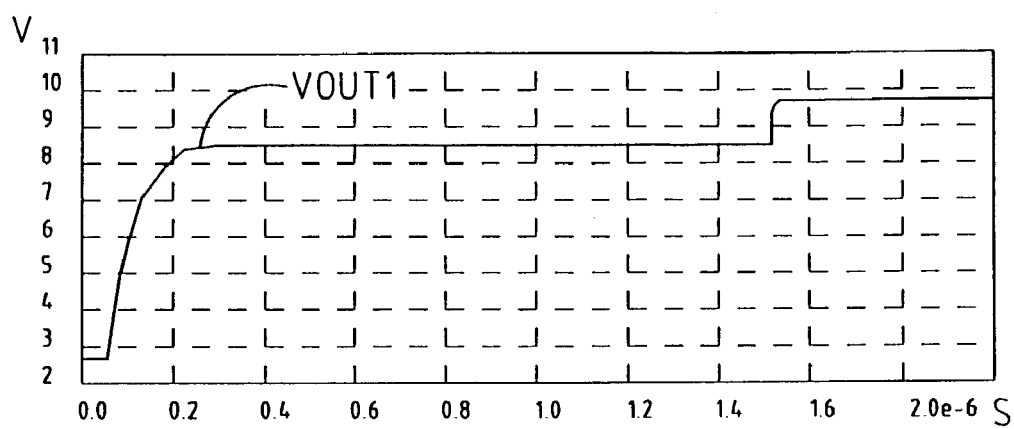
FIGS. 4 and 5 show respectively the output voltages and the voltages on the nodes Ji and Ki of the charge pump circuit in FIG. 1.
Figure 5:
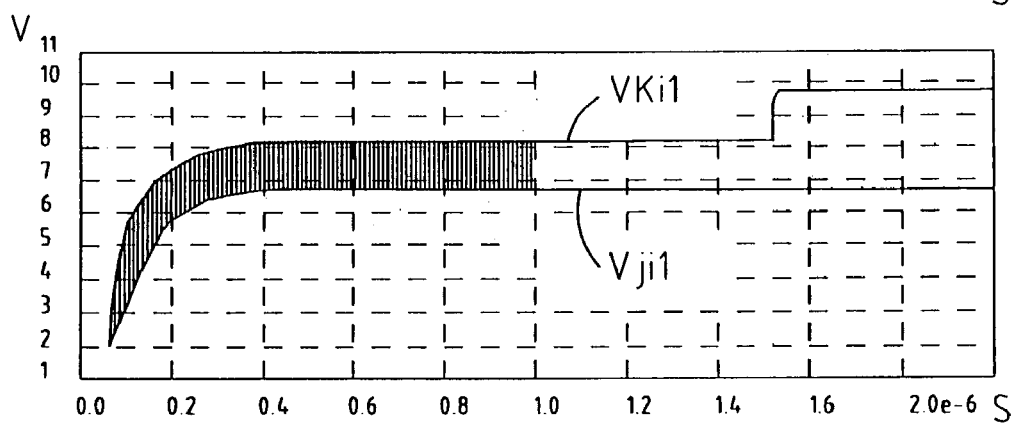
Figure 6:
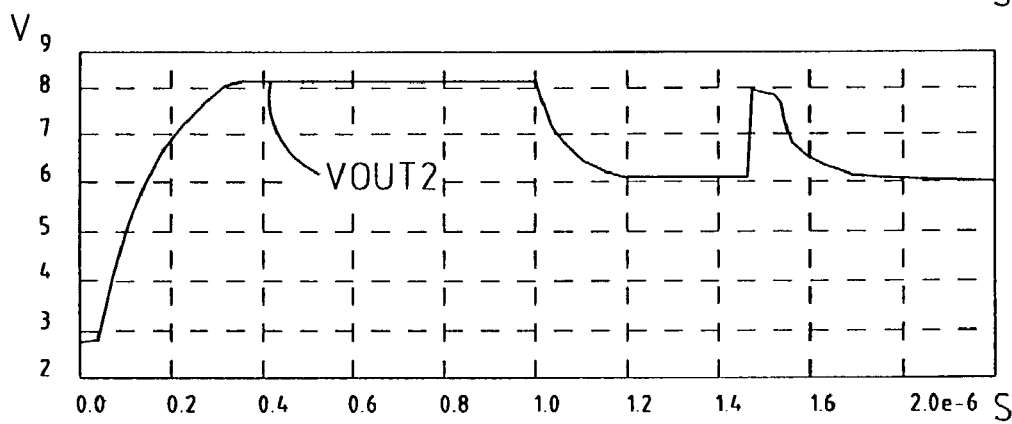
FIGS. 6 and 7 show respectively the output voltages and the voltages on the nodes Ji and Ki of the charge pump system of FIG. 3 according to an embodiment of the present invention.
Figure 7:
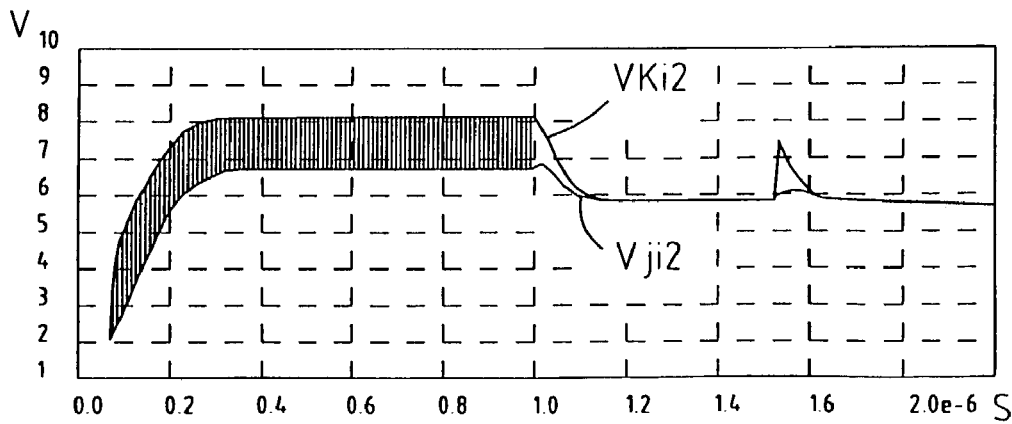

FIG. 3 shows a single stage Zi of the charge pump system according to an embodiment of the present invention. This single stage Zi of said charge pump system differs from the single circuit stage Si (FIG. 2) of the known charge pump circuit by the presence of a circuit block 1 positioned between the terminals of the capacitors TC1 and TC2 connected to the respective inverter. The charge pump system can comprise a single stage Zi or N stages Zi (Z1 . . . ZN) positioned like the circuit stages S1 . . . SN of the charge pump circuit of FIG. 1.

The circuit block 1 enables the nodes Ji and Ki to have the same voltage values in off conditions of the charge pump system, thus remaining linked between each other.

The circuit block 1 comprises a PMOS transistor for high voltages PM whose drain and source terminals are connected to the terminals Ji and Ki of the single stage Zi of the charge pump system shown in FIG. 3. The bulk terminal of the PM transistor is connected with the terminal Di of the single charge pump stage Zi since the highest voltage of the single stage Zi is present on terminal Di. A voltage signal POL supplied by a control device 2 acts on the gate terminal of the PM transistor.

Figure 1:
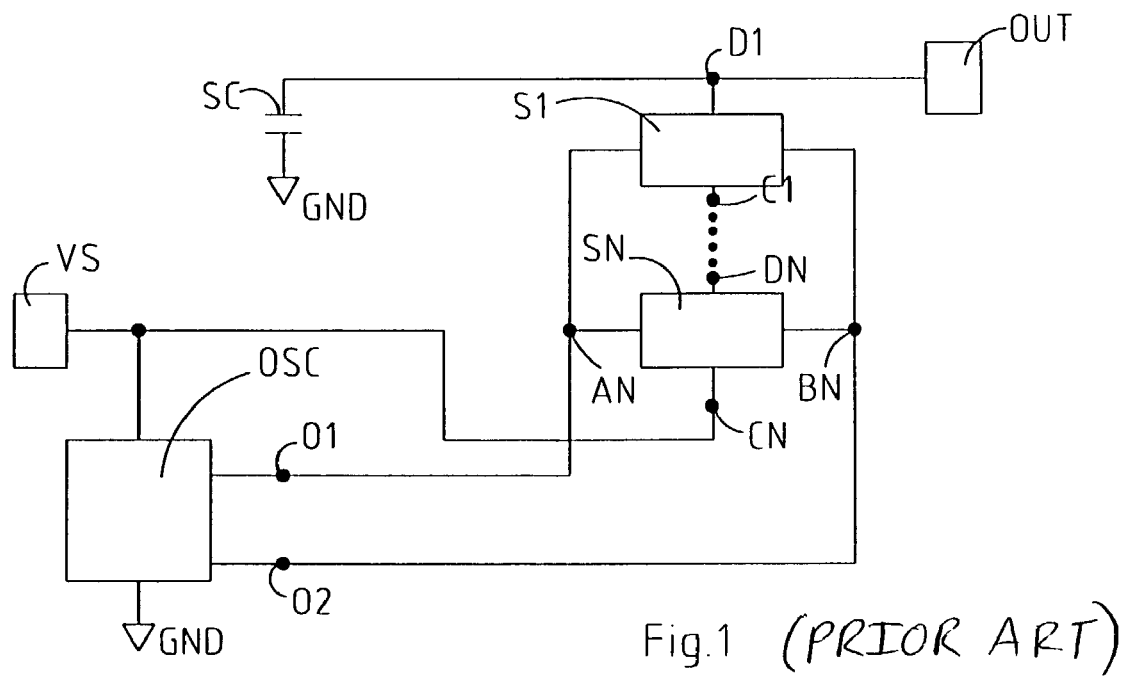
FIG. 1 is a schematic view of a charge pump circuit according to the known art.

The control device 2 comprises a level translator fed by the voltage signal output from the charge pump system (that is the voltage signal present on the terminal OUT that coincides with the terminal Di in the event the charge pump system is made up of a single stage Zi or the voltage signal present on the terminal D1 of the last stage in the event the charge pump system is made up of N stages Zi and these stages Zi are positioned like the stages Si in FIG. 1). The voltage signal POL output from the level translator is such that it turns on the PMOS PM transistor only in off conditions of the charge pump circuit; in fact the level translator is controlled by a suitable control signal X at low voltage that acts on the level translator so that the output signal POL is low (substantially equal to 0V) only with the charge pump circuit off while it is equal to the input signal OUT during the operating of the charge pump circuit, thus determining the PMOS PM to be turned on (voltage signal POL substantially at 0V) or turned off (voltage signal POL high).

As already mentioned if in off conditions of the charge pump circuit in FIG. 1 (known art) there is an increase of the output voltage on the output of the last stage of the above mentioned circuit, only one of the two transistors PMOS M1, M2 of said last stage is conductive and manages to charge one of the two capacitances TC1, TC2. In particular the capacitance charged is that which is at the highest voltage of the two and therefore causes greater unbalance of voltage between the terminals Ji and Ki causing a greater potential difference between the gate and bulk terminals of the transistors PMOS M1, M2 of the output stage Si (stage S1 in FIG. 1) possibly making them break down.

FIGS. 4, 5 and FIGS. 6, 7 show respectively the time diagrams of the voltage in output Vout1 (FIG. 4) and of the voltages on the terminals Ji and Ki Vji1, Vki1 (FIG. 5) of the last stage of the known charge pump circuit (stage Si in FIG. 1) and the time diagrams of the voltage in output Vout2 (FIG. 6) and of the voltages on the terminals Ji and Ki Vji2, Vki2 (FIG. 7) of the last stage (stage Z1 considering the configuration of FIG. 2) of the charge pump system with the protection device according to an embodiment of the invention. The time diagrams of the above mentioned voltages derive from simulations on the two charge pump circuit structures (that known and that according to an embodiment of the invention) made by turning on the above mentioned structures at the instant t=0 and turning off at the instant t=1 $\mu$s when the voltage in output has already reached the operating value. At the instant t=1.5 $\mu$s a step voltage signal is applied (by means of capacitive coupling) on the output terminal OUT. From the diagrams it can be seen that the presence of the protection device according to this embodiment of the invention causes the unbalance of the potentials between the nodes Ji and Ki of the circuit to be annulled.

What is claimed is:

1. Charge pump system supplied by a direct voltage signal and supplying on the output terminal a voltage signal with a higher value of said direct voltage signal, said charge pump system comprising an oscillator supplied by said direct voltage signal and having two outputs in phase opposition between each other, a load storage capacitor having a first terminal connected to a first reference potential and a second terminal connected to the output terminal of the charge pump system, at least one charge section having an output charge terminal, an input supply terminal, a first side terminal and a second side terminal connected respectively to the outputs of said oscillator, a first charge transfer capacitor and a second charge transfer capacitor having respective first terminals connected to said first and second side terminals, a bridge comprising two inverters CMOS connected together with loop connection so as to form a flip-flop having inputs connected to respective second terminals of said first charge transfer capacitor and of said second charge transfer capacitor, negative supply terminals connected together to said input supply terminal and positive supply terminals connected together to said output charge terminal, said at least one charge section being connected in series with the output terminal connected to the second terminal of said charge storage capacitor and the input terminal connected to the direct voltage supply signal, wherein said at least one charge section comprises a protection device positioned between said second terminals of said first charge transfer capacitor and of said second charge transfer capacitor, said protection device being capable of making substantially equal the voltage signals in said second terminals of said first charge transfer capacitor and of said second charge transfer capacitor in off conditions of said charge pump system.

2. System according to claim 1, wherein said protection device comprises a MOS transistor having the drain and source terminals connected with said second terminals of said first charge transfer capacitor and of said second charge transfer capacitor of the at least one charge section and the gate terminal connected with the output terminal of a control device suitable for turning off said MOS transistor during the operation of the charge pump system and turning on said MOS transistor in off conditions of said charge pump system.

3. System according to claim 2, wherein said MOS transistor of said protection device is a MOS transistor for high voltages.

4. System according to claim 3, wherein said control device is supplied by the voltage signal in output to the charge pump system.

5. System according to claim 4, wherein said MOS transistor of said protection device is a PMOS transistor and said control device supplies alternatively in output a voltage signal substantially equal to the voltage signal in output to the charge pump system with said charge pump system off and a voltage signal substantially null to the charge pump system operating.

6. System according to claim 1, wherein said two inverters CMOS comprise four MOS transistors and corresponding bulk diodes positioned so as to create a conduction path between the input supply terminal and the output charge terminal when the inverters do not conduct.

7. System according to claim 1, wherein said input supply terminal is connected to a said direct supply voltage.

8. System according to claim 1, wherein said at least one charge section comprises a succession of N charge sections connected in series in which each charge section has the input supply terminal connected to the output charge terminal of the previous charge section, the supply terminal is connected to said direct supply voltage and the output charge terminal of the last section is connected to the output terminal of the charge pump system.

9. A charge-pump stage, comprising:
first and second clock input nodes;
a first capacitor having a first node coupled to the first clock input node and having a second node;
a second capacitor having a first node coupled to the second clock input node and having a second node; and
a switch operable to couple the first capacitor second node to the second capacitor second node when the charge-pump stage is inactive.

10. A charge-pump stage, comprising:
first and second clock input nodes;
a first capacitor having a first node coupled to the first clock input node and having a second node;
a second capacitor having a first node coupled to the second clock input node and having a second node;
a charging network coupled between the second nodes of the first and second capacitors; and
a switch having a first node directly coupled to the second node of the first capacitor and having a second node directly coupled to the second node of the second capacitor.

11. A charge-pump stage, comprising:
first and second clock input nodes;
a first capacitor having a first node coupled to the first clock input node and having a second node;
a second capacitor having a first node coupled to the second clock input node and having a second node;
a flip-flop having a pair of control terminals respectively coupled to the second nodes of the first and second capacitors; and
a switch having a first node directly coupled to the second node of the first capacitor and having a second node directly coupled to the second node of the second capacitor.

12. A charge-pump stage, comprising:
first and second clock input nodes;
a first capacitor having a first node coupled to the first clock input node and having a second node;
a second capacitor having a first node coupled to the second clock input node and having a second node;
a J–K flip-flop having a J node coupled to the second node of the first capacitor and having a K node coupled to the second node of the second capacitor; and
a switch having a first node directly coupled to the second node of the first capacitor and having a second node directly coupled to the second node of the second capacitor.

13. The charge-pump stage of claim 9 wherein the switch comprises a PMOS transistor.

14. A method, comprising:
deactivating a charge pump having first and second clock input nodes, a first capacitor having a first node coupled to the first clock input node and having a second node, and a second capacitor having a first node coupled to the second clock input node and having a second node; and
coupling the pair of capacitor second nodes together through a low impedance when the charge pump is inactive.

15. The method of claim 14 wherein coupling the clock input nodes comprises coupling the pair of clock input nodes together with a transistor.

16. The method of claim 14 wherein coupling the clock input nodes comprises turning on an MOS transistor having a first node coupled to one of the clock input nodes and having a second node coupled to the other of the clock input nodes.

17. The method of claim 14 wherein the low impedance comprises the on resistance of an MOS transistor.

18. An integrated circuit, comprising:
a charge pump, comprising:
a charge-pump stage, comprising:
first and second clock input nodes;
a first capacitor having a first node coupled to the first clock input node and having a second node;
a second capacitor having a first node coupled to the second clock input node and having a second node; and
a switch operable to couple the first capacitor second node to the second capacitor second node when the charge-pump stage is inactive.

19. An electronic system, comprising:
an integrated circuit, comprising:
a charge pump, comprising:
a charge-pump stage, comprising:
first and second clock input nodes;
a first capacitor having a first node coupled to the first clock input node and having a second node;

a second capacitor having a first node coupled to the second clock input node and having a second node; and
a switch operable to couple the first capacitor second node to the second capacitor second node when the charge-pump stage is inactive.

20. A charge-pump stage, comprising:
a flip-flop having first and second data input nodes, a voltage input node, and a pumped-voltage output node;
a first capacitor having a first node coupled to the first data input node and having a second node operable to receive a first clock phase;
a second capacitor having a first node coupled to the second data input node and having a second node operable to receive a second clock phase; and
a switch having a first and second nodes respectively coupled to the first and second data input nodes.

21. The charge-pump stage of claim 20 wherein the flip-flop comprises:
a first PMOS transistor having a first node coupled to the pumped-voltage output node, a second node coupled to the second data input node, and a control node coupled to the first data input node;
a first NMOS transistor having a first node coupled to the voltage input node, a second node coupled to the second data input node, and a control node coupled to the first data input node;
a second PMOS transistor having a first node coupled to the pumped-voltage output node, a second node coupled to the first data input node, and a control node coupled to the second data input node; and
a second NMOS transistor having a first node coupled to the voltage input node, a second node coupled to the first data input node, and a control node coupled to the second data input node.

22. The charge-pump stage of claim 20 wherein the flip-flop comprises:
a first PMOS transistor having a first node coupled to the pumped-voltage output node, a second node coupled to the second data input node, a control node coupled to the first data input node, and a bulk node coupled to the pumped-voltage output node;
a first NMOS transistor having a first node coupled to the voltage input node, a second node coupled to the second data input node, a control node coupled to the first data input node, and a bulk node coupled to the voltage input node;
a second PMOS transistor having a first node coupled to the pumped-voltage output node, a second node coupled to the first data input node, a control node coupled to the second data input node, and a bulk node coupled to the pumped-voltage output node; and
a second NMOS transistor having a first node coupled to the voltage input node, a second node coupled to the first data input node, a control node coupled to the second data input node, and a bulk node coupled to the voltage input node.

23. The charge-pump stage of claim 20 wherein:
the first node of the switch is directly connected to the second node of the first capacitor; and
the second node of the switch is directly connected to the second data input node.

24. The charge-pump stage of claim 20 wherein the switch comprises a PMOS transistor having a first node coupled to the first data input node, a second node coupled to the second data input node, a control node, and a bulk node coupled to the pumped-voltage output node.

25. The charge-pump stage of claim 20, further comprising a controller coupled to the switch.

26. The charge-pump stage of claim 20, further comprising:
wherein the switch comprises a PMOS transistor having a control terminal; and
a controller operable to couple the control terminal of the PMOS transistor to the pumped-voltage output node while the charge-pump stage is active and to couple the control terminal to ground while the charge-pump stage is inactive.

27. A charge pump, comprising:
an elevated-supply node;
a supply node;
first and second clock nodes; and
a plurality of charge-pump stages serially coupled between the supply node and the elevated-supply node, each stage having first and second clock input nodes respectively coupled to the first and second clock nodes and including a protection circuit operable to couple the first clock node to the second clock node when the charge-pump stage is inactive.

28. A charge pump, comprising:
an elevated-supply node;
a supply node;
first and second clock nodes; and
a plurality of charge-pump stages each comprising,
a flip-flop having first and second data input nodes, a voltage input node, and a pumped-voltage output node, the voltage input node coupled to the supply node or to the pumped-voltage output node of a preceding stage, the pumped-voltage output node coupled to the elevated-supply node or to the voltage input node of a subsequent stage;
a first capacitor having a first node coupled to the first data input node and having a second node coupled to the first clock node;
a second capacitor having a first node coupled to the second data input node and having a second node coupled to the second clock node; and
a switch having a first and second nodes respectively coupled to the first and second data input nodes.

29. The charge pump of claim 28 wherein the switch comprises a PMOS transistor having a first node coupled to the first data input node, a second node coupled to the second data input node, and a control node operable to be coupled to the elevated-voltage terminal while the stage is active and to ground when the stage is inactive.

30. The charge pump of claim 28 wherein the switch comprises a PMOS transistor having a first node coupled to the first data input node, a second node coupled to the second data input node, a control node operable to be coupled to the elevated-voltage terminal while the stage is active and to ground when the stage is inactive, and a bulk node coupled to the elevated-voltage terminal.

* * * * *